United States Patent [19]
Sato

[11] Patent Number: 5,140,504
[45] Date of Patent: Aug. 18, 1992

[54] MOTOR VEHICLE HEADLAMP COMBINED WITH CLEARANCE LAMP

[75] Inventor: Osamu Sato, Shizuoka, Japan

[73] Assignee: Koito Manufacturing Co., Ltd., Tokyo, Japan

[21] Appl. No.: 757,395

[22] Filed: Sep. 10, 1991

[30] Foreign Application Priority Data

Sep. 26, 1990 [JP] Japan .................. 2-254274

[51] Int. Cl.$^5$ .............................. B60Q 1/00
[52] U.S. Cl. ........................ 362/61; 362/263; 362/265; 362/418
[58] Field of Search ............ 362/61, 66, 80, 418, 362/419, 421, 427, 428, 261, 263, 265

[56] References Cited

U.S. PATENT DOCUMENTS

| 4,539,626 | 9/1985 | Hawlitzki et al. | 362/428 |
| 4,639,840 | 1/1987 | McMahan et al. | 362/419 |
| 4,722,033 | 1/1988 | Van Dayn et al. | 362/419 |
| 4,845,598 | 7/1989 | Watanabe et al. | 362/418 |
| 4,868,722 | 9/1989 | Haradan | 362/61 |
| 4,903,173 | 2/1990 | Mochizuki et al. | 362/66 |
| 4,920,459 | 4/1990 | Rothwell, Jr. et al. | 362/61 |

Primary Examiner—Ira S. Lazarus
Assistant Examiner—Sue Hagarman
Attorney, Agent, or Firm—Sughrue, Mion, Zinn, Macpeak & Seas

[57] ABSTRACT

A motor vehicle headlamp which employs a discharge lamp as its light source, and which is combined with a clearance lamp. The clearance lamp is provided in the front end portion of a space defined by a lamp body in such a manner that the clearance lamp is adjacent to the reflector, and a ballast circuit for energizing the discharge lamp is provided behind the clearance lamp inside the lamp body.

5 Claims, 3 Drawing Sheets

MOTOR VEHICLE HEADLAMP COMBINED WITH CLEARANCE LAMP

BACKGROUND OF THE INVENTION

The present invention relates to a motor vehicle headlamp which employs a discharge lamp as its light source, and which is combined with a clearance lamp.

Recently, discharge lamps have been used for light sources for a motor vehicle headlamps because their excellent light emission efficiency and good light spectrum characteristics. However, a discharge lamp cannot be energized without a ballast circuit. In view of safety and the performance of the discharge lamp, it is desirable to arrange the ballast circuit near the discharge lamp. However, since, in the motor vehicle lamp industry, the recent trend has been to make headlamps more compact, the installation space available within the headlamp is limited.

SUMMARY OF THE INVENTION

In view of the foregoing problem, an object of the invention is to provide a motor vehicle headlamp combined with a clearance lamp in which a ballast circuit for a discharge lamp is efficiently arranged inside the lamp body.

The foregoing and other objects of the invention have been achieved by the provision of a motor vehicle headlamp with a clearance lamp in which a discharge bulb is mounted on a reflector inside a lamp body, in which, according to the invention, a clearance lamp is provided in the front end portion of the space defined by the lamp body in such a manner that the clearance lamp is adjacent to the reflector, and a ballast circuit for energizing the discharge lamp is provided behind the clearance lamp inside the lamp body.

The clearance lamp is positioned in the front end portion of the space defined by the lamp body, and the ballast circuit for operating the discharge bulb is disposed in a space behind the clearance lamp inside the lamp body. Owing to this construction, a motor vehicle headlamp can be obtained which is equal in size to but higher in performance than conventional headlamps employing other types of light sources, for instance, an incandescent light bulb.

DESCRIPTION OF THE PREFERRED EMBODIMENTS

Preferred embodiments of the invention will now be described with reference to the accompanying drawings.

Figure 1:
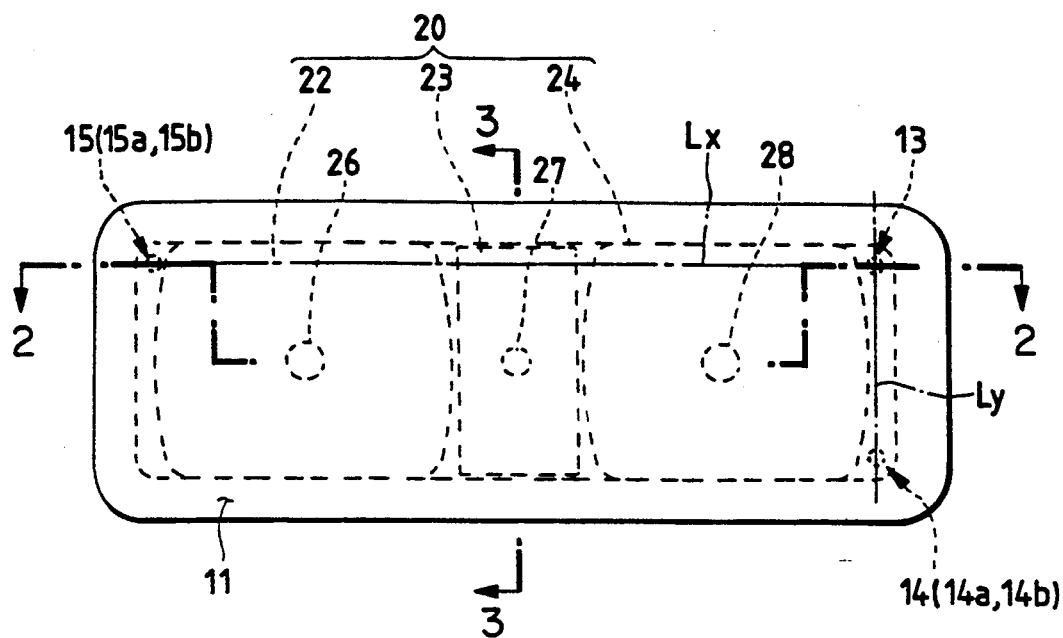
FIG. 1 is a front view of a motor vehicle headlamp with a clearance lamp and which is constructed in accordance with a first embodiment of the invention.
Figure 2:
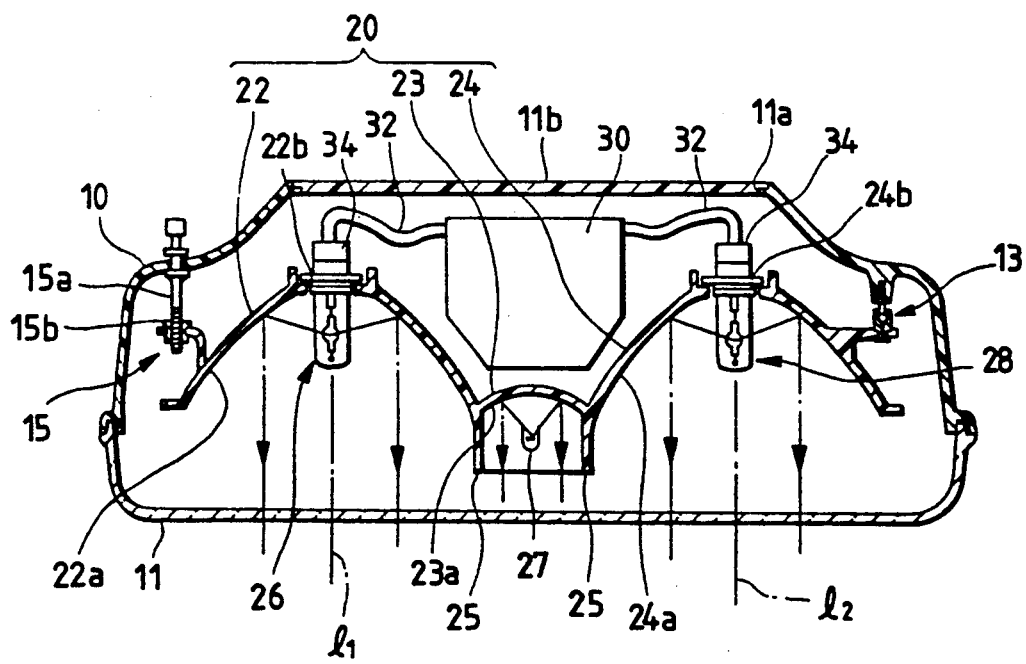
FIG. 2 is a horizontal sectional view taken along a line II—II in FIG. 1.
Figure 3:
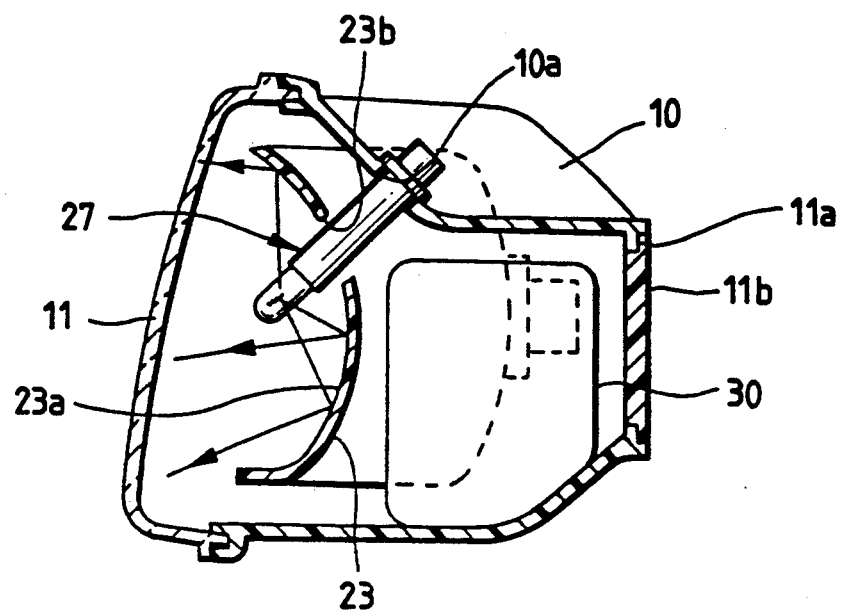
FIG. 3 is a sectional view taken along a line III—III in FIG. 1.
Figure 4:
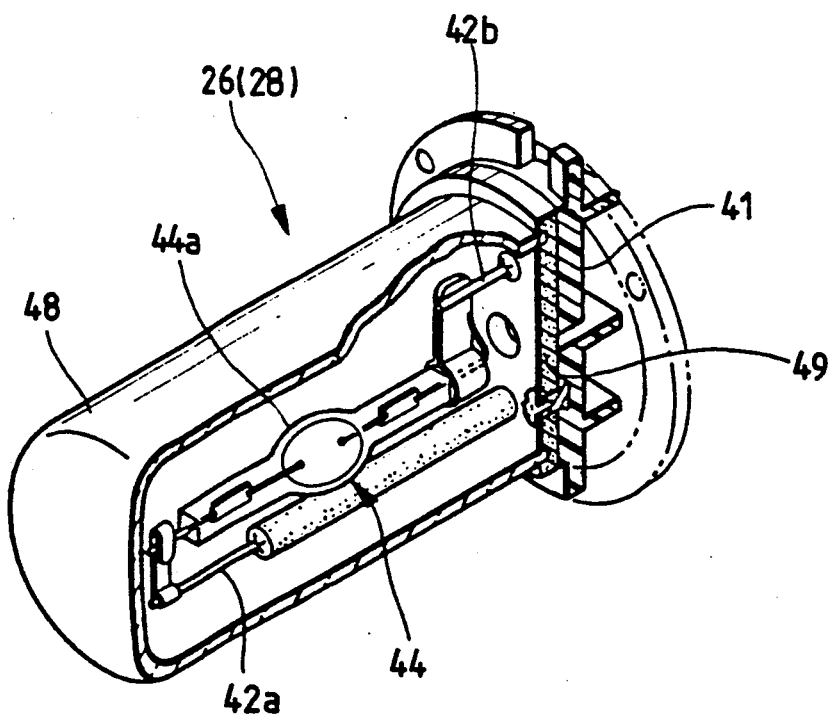
FIG. 4 is an enlarged perspective view showing a discharge bulb in the above headlamp.

FIGS. 1 through 4 shows a first embodiment of the invention. More specifically, FIG. 1 is a front view of a motor vehicle headlamp combined with a clearance lamp, which is mounted on the left side of the motor vehicle, FIG. 2 is a horizontal sectional view taken along line II—II in FIG. 1, showing the headlamp, FIG. 3 is a sectional view taken along line III—III in FIG. 1, and FIG. 4 is an enlarged perspective view of a discharge lamp.

In these figures, reference numeral 10 designates a container-shaped lamp body opening forwardly. The lamp body 10 forms a lamp chamber with a lens engaged with the front opening of the lamp body. A reflector assembly 20 is supported inside the lamp body 10, i.e., inside the lamp chamber, in such a manner that its angle of inclination (aiming direction) can be adjusted with an aiming mechanism. Further in the figures, 11a designates a bulb insertion hole formed in the rear wall of the lamp body 10. The bulb inserting hole 11a is closed with a rear cover 11b.

The reflector assembly 20 is composed of reflectors 22, 23 and 24 formed as one unit in such a manner that the reflector 23 is disposed between the reflector 22 and 24; that is, the three reflectors are juxtaposed. The reflector 22 has a reflecting surface for forming a high beam. The reflector 24 has a light reflecting surface 24a for forming a high beam and a low beam. The reflector 23, which is provided for the clearance lamp, has a light reflecting surface 23a which is defined by shades 25 extending forwards from the reflector 22 and 24.

Discharge bulbs 26 and 28 are fitted in bulb insertion holes 22b and 24b which are formed in the rear end portions of the reflectors 22 and 24, respectively. The reflector 23 is so formed that its base lies in a plane defined by the front openings of the right and left reflectors 22 and 24; that is, the reflector 23 is positioned so that it protrudes forwardly from the right and left reflectors 22 and 24 The reflector 23 has a bulb inserting hole 23b. As shown in FIG. 3, a light bulb 27 for the clearance lamp in the bulb insertion hole 10a of the lamp body 10 protrudes obliquely downwardly through the bulb inserting hole 23. A circuit unit 30 having a ballast circuit for the discharge bulbs 26 and 28 is fixedly arranged behind the reflector 23 so that it cannot interfere with the reflector assembly 20 for any aiming position thereof. Cords extending from the ballast circuit of the circuit unit 30 are connected through connectors 34 to the discharge bulbs 26 and 28.

As described above, the circuit unit 30 is provided behind the reflector 23; however, the temperature of the reflector 23 is maintained lower than those of the other reflectors 22 and 24 because the quantity of heat generated by the clearance lamp bulb 27 is smaller than the quantities of the heat generated by the discharge bulbs 26 and 28. Accordingly, the ballast circuit in the circuit unit 30 is free from the adverse effects of high temperature.

The discharge bulb 26 (28) is designed as shown in FIG. 4. That is, a pair of long and short lead supports 42a and 42b extend forwardly from a light bulb base 41 of synthetic resin to support the discharge lamp 44 at both ends. With the discharge lamp 26 (28) fitted in the bulb insertion hole 22b (or 24b), the discharge section 44a of the discharge lamp 44 is set at the focal point of the light reflecting surface 22a (24a) Of the reflector 22 (24). A cup-shaped ultraviolet-ray shielding globe 48 is fixedly secured through a globe holding plate 49 made of ceramic to the front surface of the base 41 in such a manner that it surrounds the discharge lamp 44. With the ultraviolet ray shielding globe 48, violet rays in a range of wavelengths harmful to the human body are eliminated from the light advancing from the discharge section 44a to the light reflecting surface 22a (24a).

The aiming mechanism supporting the reflector assembly 20 is composed of a swing fulcrum 13 of ball joint type 13, a vertical aiming point 14 for swinging the reflector assembly in a vertical plane, and a horizontal aiming point 15 for swinging the reflector assembly in a horizontal plane. The aiming point 14 is designed so that an aiming screw 14a, which is engaged threadedly with the lamp body 10 in such a manner as to be able to move back and forth, is engaged with a nut 14b provided on the reflector side. The aiming point 15 is designed in the same manner. That is, an aiming screw 15a engaged threadedly with the lamp body 10 in such a manner as to be able to move back and forth is engaged with a nut 15b provided On the reflector side.

With the above-described construction, by turning the aiming screws 14a and 15a, the reflector assembly 20 can be swung about the horizontal swing axis Lx or the vertical swing axis Ly; that is, the angle of inclination of the axis of irradiation $l_1$ ($l_2$) of the headlamp can be adjusted in both horizontal and vertical directions.

Figure 5:
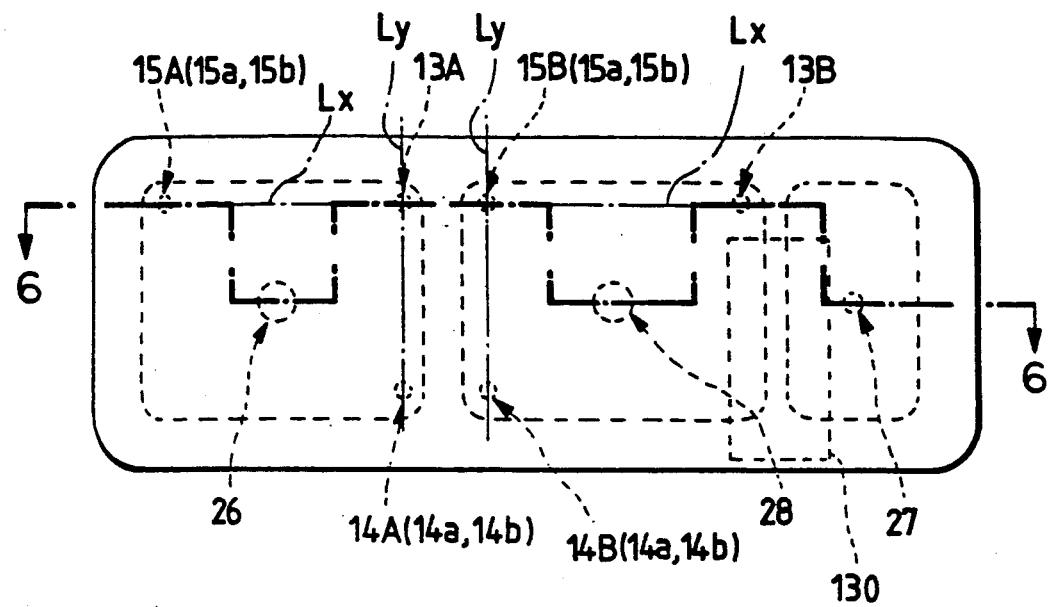
FIG. 5 is a front view of a motor vehicle headlamp with a clearance lamp and which is constructed in accordance with a second embodiment of the invention.
Figure 6:
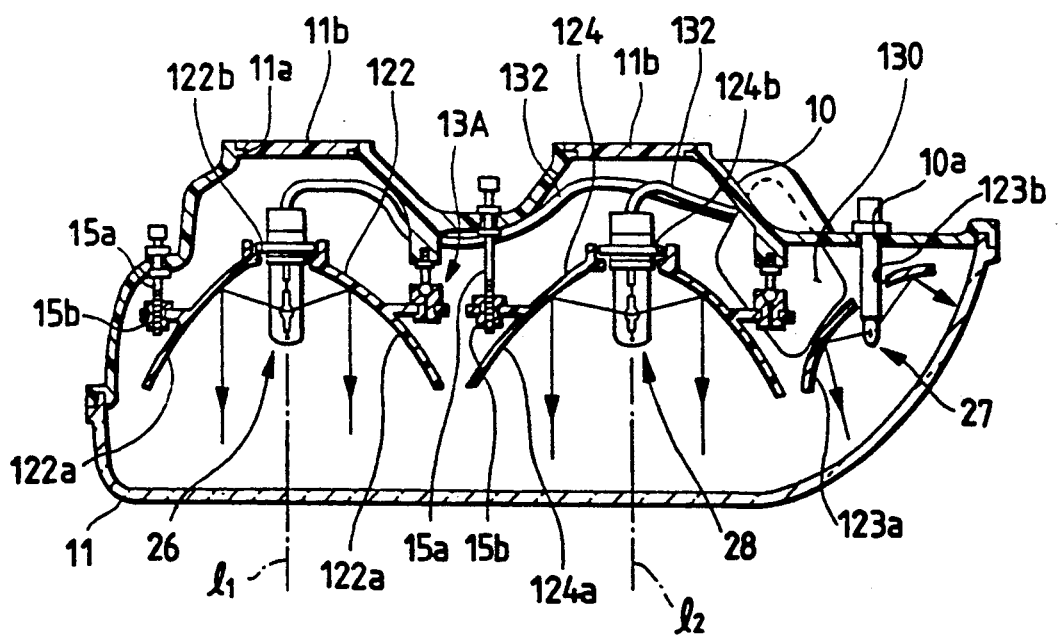
FIG. 6 is a horizontal sectional view taken along a line VI—VI in FIG. 5.

FIGS. 5 and 6 show a second embodiment of the invention. More specifically, FIG. 5 is a front view of a motor vehicle headlamp with a clearance lamp constructed in accordance with a second embodiment of the invention, and FIG. 6 is a horizontal sectional view taken along the line VI—VI in FIG. 5.

The headlamp shown in FIGS. 5 and 6 is to be mounted on the left side of the front end of a motor vehicle, and therefore it is formed so that its right portion (as viewed from the front of the headlamp) extends laterally.

Reflectors 122 and 124 disposed in the lamp body 10 are adjacent to each other. The reflector 122 has a reflecting surface 122a for forming a high beam, and the reflector 124 has a reflecting surface 124a for forming both a high beam and a low beam. The reflectors 122 and 124 have bulb insertion holes 122b and 124b in which respective discharge bulbs 26 and 28 are fitted. An independent reflector 123 for a clearance lamp, which has a reflecting surface 123a, is arranged on the right side of the reflector 124 with its axis of irradiation extending outwardly. The reflectors 122 and 124 are supported by the respective aiming mechanisms so that they can be aimed as desired. Further in FIGS. 5 and 6, 13A and 13B designate swing fulcrums; 14A and 14B, vertical aiming points; and 15A and 15B, horizontal aiming points.

A light bulb 27 for the clearance lamp is fitted in a bulb insertion hole 10a formed in the lamp body 10 so that protrudes forwardly through a bulb insertion hole 123 formed in the reflector 123. A circuit unit 130 having a ballast circuit for the discharge bulbs 26 and 28 is mounted behind the portion of the reflector 123 on the side of the reflector 124. Cords 132 extending from the circuit unit 130 are connected to the discharge bulbs 26 and 28. The other components are the same as those in the above-described first embodiment, and are thus designated by the same reference numerals or characters.

The above-described embodiments are of a four-lamp type; however, it should be noted that the invention is not limited thereto or thereby. That is, the technical concept of the invention can be equally applied to a headlamp of a two-lamp type in which a shade or reflector is moved to switch between high and low beams.

As is apparent from the above description, in the motor vehicle headlamp according to the invention, discharge bulbs are employed as the light sources, the clearance lamp is positioned in the front portion of the space defined by the lamp body, and the ballast circuit for the discharge bulbs is arranged in the space behind the clearance lamp inside the lamp body. Hence, the inventive motor vehicle headlamp with the clearance lamp is compact.

What is claimed is:

1. In a motor vehicle headlamp having a clearance lamp in which a discharge bulb is mounted on a reflector inside a lamp body, the improvement wherein:
   a clearance lamp is comprising a second reflector and a light bulb is provided in a front end portion of a space defined by said lamp body in such a manner that said clearance lamp is adjacent to said reflector and a space is defined behind said clearance lamp adjacent said reflector, and
   a ballast circuit for exciting said discharge lamp is provided in said space defined behind said clearance lamp and inside said lamp body.

2. A motor vehicle lamp in which a headlamp combined with a clearance lamp, comprising:
   a container-shaped lamp body defining a lamp chamber;
   a lens covering a front opening of said lamp body;
   a reflector assembly comprising first and second reflectors for producing headlamp beams and a third reflector for producing a clearance light, said third reflector being disposed between said first and second reflectors, and a space being defined within said lamp body behind said third reflector;
   an aiming mechanism supporting said reflector assembly within said lamp body;
   first and second discharge bulbs mounted in bulb insertion openings in said first and second reflectors, respectively;
   a ballast circuit for exciting said first and second discharge bulbs mounted in said space behind said third reflector; and
   wires for connecting said first and second discharge bulbs to said ballast circuit.

3. A motor vehicle lamp in which a headlamp combined with a clearance lamp, comprising:
   a container-shaped lamp body defining a lamp chamber;
   a lens covering a front opening of said lamp body;
   first and second reflectors mounted in said lamp body for producing headlamp beams;
   a third reflector for producing a clearance light, said third reflector being mounted in said lamp body between said second reflector and side of said lamp body, a space being defined behind and between said second and third reflectors;
   first and second aiming mechanisms for supporting said first and second reflector within said lamp body;

first and second discharge bulbs mounted in bulb insertion openings in said first and second reflectors, respectively;

a ballast circuit for exciting said first and second discharge bulbs mounted in said space behind and between said second and third reflectors; and wires for connecting said first and second discharge bulbs to said ballast circuit.

4. A motor vehicle lamp in which a headlamp combined with a clearance lamp, comprising:

a container-shaped lamp body defining a lamp chamber;

a lens covering a front opening of said lamp body;

a reflector assembly comprising first and second reflectors for producing headlamp beams and a third reflector for producing a clearance light, said third reflector being disposed between said first and second reflectors, and a space being defined within said lamp body behind said third reflector;

an aiming mechanism supporting said reflector assembly within said lamp body;

first and second bulbs mounted in bulb insertion openings in said first and second reflectors, respectively, at least one of said bulbs being a discharge bulb;

a ballast circuit for exciting said first and second discharge bulbs mounted in said space behind said third reflector; and wires for connecting said first and second discharge bulbs to said ballast circuit.

5. A motor vehicle lamp in which a headlamp combined with a clearance lamp, comprising:

a container-shaped lamp body defining a lamp chamber;

a lens covering a front opening of said lamp body;

first and second reflectors mounted in said lamp body for producing headlamp beams;

a third reflector for producing a clearance light, said third reflector being mounted in said lamp body between said second reflector and side of said lamp body, a space being defined behind and between said second and third reflectors;

first and second aiming mechanisms for supporting said first and second reflector within said lamp body;

first and second bulbs mounted in bulb insertion openings in said first and second reflectors, respectively, at least one of said bulbs being a discharge bulb;

a ballast circuit for exciting said first and second discharge bulbs mounted in said space behind and between said second and third reflectors; and wires for connecting said first and second discharge bulbs to said ballast circuit.

* * * * *